(12) United States Patent
Uneme

(10) Patent No.: US 11,923,650 B2
(45) Date of Patent: Mar. 5, 2024

(54) CABLE CONNECTION PART STRUCTURE OF POWER CONTROL UNIT

(71) Applicant: HONDA MOTOR CO., LTD., Tokyo (JP)

(72) Inventor: Takahiro Uneme, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 159 days.

(21) Appl. No.: 17/583,249

(22) Filed: Jan. 25, 2022

(65) Prior Publication Data

US 2022/0247102 A1 Aug. 4, 2022

(30) Foreign Application Priority Data

Feb. 1, 2021 (JP) .................................. 2021-014427

(51) Int. Cl.
*H01R 9/24* (2006.01)
*B60R 16/023* (2006.01)
*H01R 4/30* (2006.01)
*H01R 13/621* (2006.01)
*H01R 13/74* (2006.01)

(52) U.S. Cl.
CPC ....... *H01R 9/2491* (2013.01); *H01R 13/6215* (2013.01); *H01R 13/748* (2013.01); *B60R 16/0238* (2013.01); *H01R 4/308* (2013.01); *H01R 2201/26* (2013.01)

(58) Field of Classification Search
CPC ................ H01R 9/2491; H01R 13/748; H01R 13/6215; H01R 4/308; H01R 2201/26; H01R 13/74; H01R 13/59
See application file for complete search history.

(56) References Cited

U.S. PATENT DOCUMENTS 9,847,612 B2 * 12/2017 Okamoto ............. H01R 13/748
10,431,925 B2 * 10/2019 Yuki ........................ B60K 6/40
11,502,447 B2 * 11/2022 Okayasu ............. H01R 13/502

FOREIGN PATENT DOCUMENTS

JP 2019-099003 6/2019

* cited by examiner

*Primary Examiner* — Oscar C Jimenez
*Assistant Examiner* — Paul D Baillargeon
(74) *Attorney, Agent, or Firm* — Amin, Turocy & Watson, LLP

(57) ABSTRACT

A cable connection part structure includes a power control unit, a unit-side connector and a cable-side connector. The unit-side connector is connected to a power supply passage of an electric power control device and has a first connection terminal directed to a space below a unit case. The cable-side connector is connected to a power supply cable and has a second connection terminal connected to a first connection terminal from below the unit case. The cable-side connector has a connector case, and a bolt fixed to a connector case and having a shaft section passing upward through a part of the unit case from below. A nut is fastened to the shaft section of the bolt passing through the unit case from above.

2 Claims, 6 Drawing Sheets

CABLE CONNECTION PART STRUCTURE OF POWER CONTROL UNIT

CROSS-REFERENCE TO RELATED APPLICATION

Priority is claimed on Japanese Patent Application No. 2021-014427, filed Feb. 1, 2021, the content of which is incorporated herein by reference.

BACKGROUND OF THE INVENTION

Field of the Invention

The present invention relates to a cable connection part structure for a power control unit mounted on a vehicle.

Description of Related Art

In many hybrid vehicles or electric vehicles, a power control unit (PCU) is attached to an upper portion of a motor case in which a driving motor is accommodated. The power control unit converts direct current electric power of a battery into high voltage alternating current electric power appropriate for driving of the motor, steps down the alternating current electric power generated by the motor, and converts the alternating current electric power into direct current electric power to charge the battery. The battery is conventionally disposed at a position separated from the power control unit, and the battery and the power control unit are connected by a power supply cable (for example, see Japanese Unexamined Patent Application, First Publication No. 2019-99003).

A power supply passage in the power control unit and the power supply cable are electrically connected by a connector (a unit-side connector and a cable-side connector). The cable-side connector is electrically connected to the unit-side connector through insertion of a pin or the like, and the connectors are fixed to each other through bolt fastening or the like.

SUMMARY OF THE INVENTION

In the cable connection part structure for a power control unit, after the cable-side connector is electrically connected to the unit-side connector through insertion of the pin or the like, there is a need to fix the connectors through bolt fastening or the like. For this reason, when the power supply cable is pulled out from below the power control unit, fastening work of the connectors must be performed from below the power control unit. However, for example, when the power control unit is disposed near a rear portion in an engine compartment (a front compartment) or the like, it may be difficult to perform fastening work of the connectors from below the power control unit. In this case, while the connecting place of the power control unit and the power supply cable will be moved to another position, when the battery is disposed behind the engine compartment (the front compartment), a routing length of the power supply cable becomes longer than necessary, which is not preferable.

In consideration of the above-mentioned circumstances, an aspect according to the present invention is directed to providing a cable connection part structure for a power control unit capable of easily fixing a cable-side connector disposed below the power control unit to a unit-side connector from above.

In order to solve the above-mentioned problems and accomplish the purpose related thereto, the present invention employs the following aspects.

(1) A cable connection part structure for a power control unit according to an aspect of the present invention is a cable connection part structure for a power control unit that connects a power control unit configured to control electric power and a power supply cable pulled out downward from the power control unit, the cable connection part structure includes: the power control unit having an electric power control device and a unit case that accommodates the electric power control device; a unit-side connector connected to a power supply passage of the electric power control device in the unit case and having a first connection terminal directed toward a space below the unit case; and a cable-side connector connected to the power supply cable and having a second connection terminal connected to the first connection terminal from below the unit case, the cable-side connector has: a connector case configured to support the second connection terminal; and a bolt fixed to the connector case and having a shaft section passing upward through a part of the unit case from below, and the cable-side connector is fixed to the unit case and the unit-side connector by fastening a nut to the shaft section passing through the unit case from above.

According to the above-mentioned aspect (1), when the power supply cable is connected to the power control unit, the unit-side connector is previously attached to the unit case, and the shaft section of the bolt of the cable-side connector passes upward through a part of the unit case from below. In this state, when the nut is fastened to the shaft section passing through the unit case from above the unit case, the cable-side connector is pulled upward, and fixed to the unit case and the unit-side connector.

(2) In the above-mentioned aspect (1), the unit case may include a case main body configured to accommodate the electric power control device and open a connecting section of the power supply passage and the first connection terminal from above; and a case cover configured to cover the case main body from above, and the power supply passage may be able to be connected to the first connection terminal through an opening above the case main body.

According to the above-mentioned aspect (2), before the case cover is attached to the case main body, the power supply passage of the electric power control device can be easily connected to the first connection terminal of the unit-side connector from above through the opening of the case main body.

(3) In the above-mentioned aspect (1) or (2), the cable-side connector may include a plurality of retainer blocks accommodated in the connector case and configured to sandwich the power supply cable from an outer side in a radial direction, and the retainer block and the connector case may have cam surfaces that push the retainer block inward in the radial direction according to upward displacement of the connector case when the nut is fastened to the shaft section of the bolt.

According to the above-mentioned aspect (3), when the shaft section of the bolt of the cable-side connector passes through the unit case from above and the nut is fastened to the shaft section in this state, the connector case of the cable-side connector is gradually pulled upward. Accordingly, a pressing force is applied to the retainer block from the connector case through the cam surface, and the retainer block is pressed inward in the radial direction. As a result, the power supply cable is firmly fixed to the plurality of retainer blocks, and a large shake of the power supply cable due to traveling of the vehicle is minimized. Accordingly, when this configuration is employed, there is no need to separately attach the support member to the power control unit to minimize a shake of the power supply cable.

According to the aspect of the present invention, the shaft section of the bolt fixed to the cable-side connector passes upward through the unit case of the power control unit from below, the nut is fastened to the shaft section of the bolt from above the unit case, and thus the cable-side connector can be fixed to the power control unit and the unit-side connector in a state in which the cable-side connector is connected to the unit-side connector. Accordingly, according to the aspect of the present invention, the cable-side connector disposed below the power control unit can be easily fixed to the unit-side connector from above.

DETAILED DESCRIPTION OF THE INVENTION

Hereinafter, an embodiment of the present invention will be described with reference to the accompanying drawings.

Figure 1:
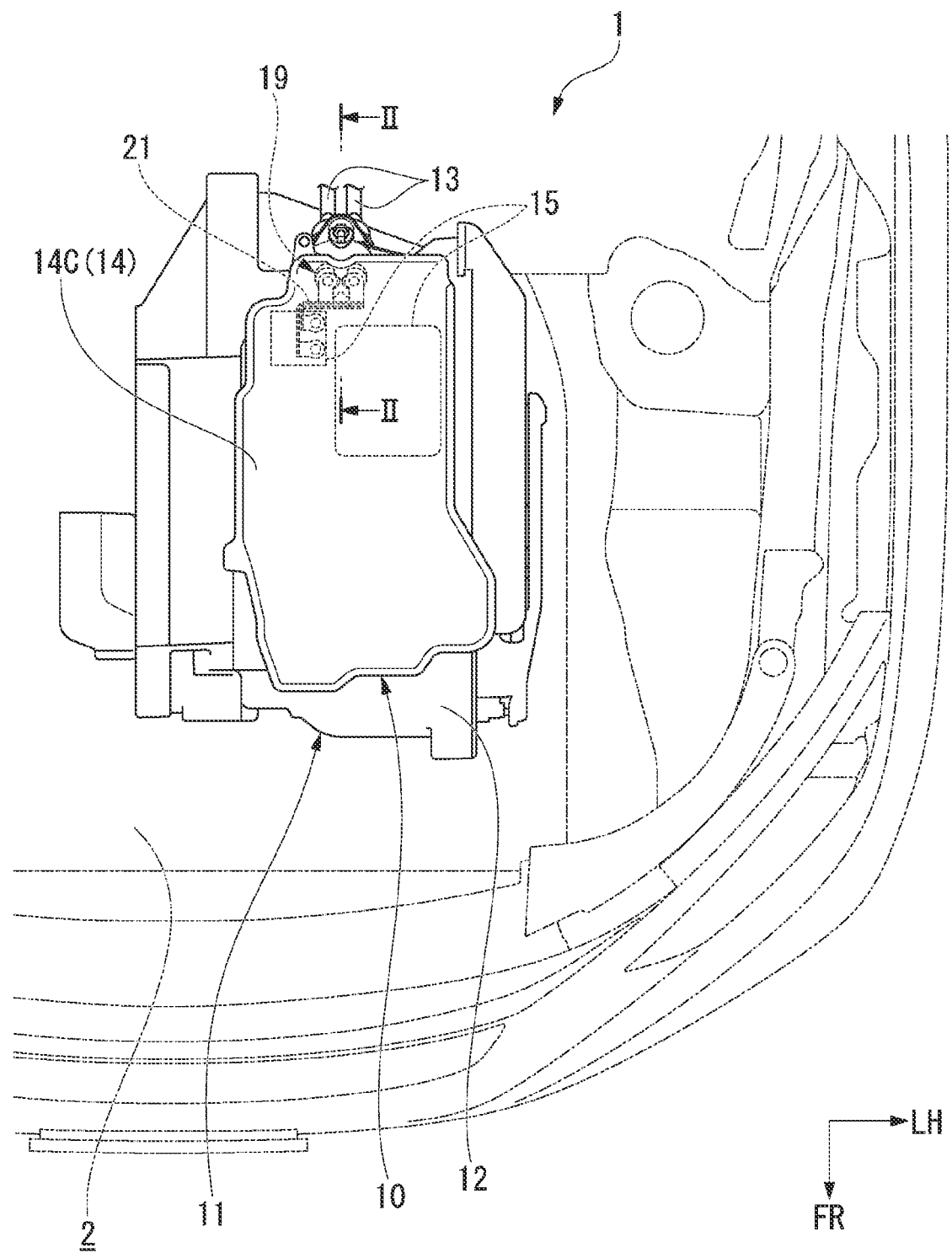
FIG. 1 is a plan view of a vehicle on which an assembly of a power control unit of an embodiment and a motor unit are mounted.

FIG. 1 is a plan view of a vehicle 1 on which an assembly of a power control unit 10 and a motor unit 11 are mounted. An arrow FR in FIG. 1 indicates a forward direction of the vehicle, and an arrow LH indicates a leftward direction of the vehicle.

The vehicle 1 of the embodiment is a hybrid vehicle including an engine and a motor (not shown). The motor unit 11 is assembled integrally with an end portion of the engine (not shown) on an outer side in the vehicle width direction. The motor unit 11 includes a vehicle driving motor and a generator, which are accommodated in a motor case 12. The power control unit 10 (power drive unit (PDU)) is attached to an upper portion of the motor case 12. The power control unit 10 boosts direct current electric power of a high voltage battery (not shown; hereinafter referred to as "a battery") mounted on the vehicle 1 to a predetermined voltage, and converts the boosted direct current electric power to alternating current electric power appropriate for driving the motor. The power control unit 10 converts the alternating current electric power regenerated by the motor or the alternating current electric power generated by the generator into direct current electric power, and steps down the electric power to a predetermined voltage to charge the battery.

The assembly of the power control unit 10 and the motor unit 11 is disposed in an engine compartment 2 (a front compartment) in front of the passenger compartment together with the engine. A power supply cable 13 connected to the battery is connected to a rear region of the power control unit 10 on the side of the lower surface. The battery is disposed below a floor or the like behind the engine compartment 2 (front compartment) of the vehicle.

Figure 2:
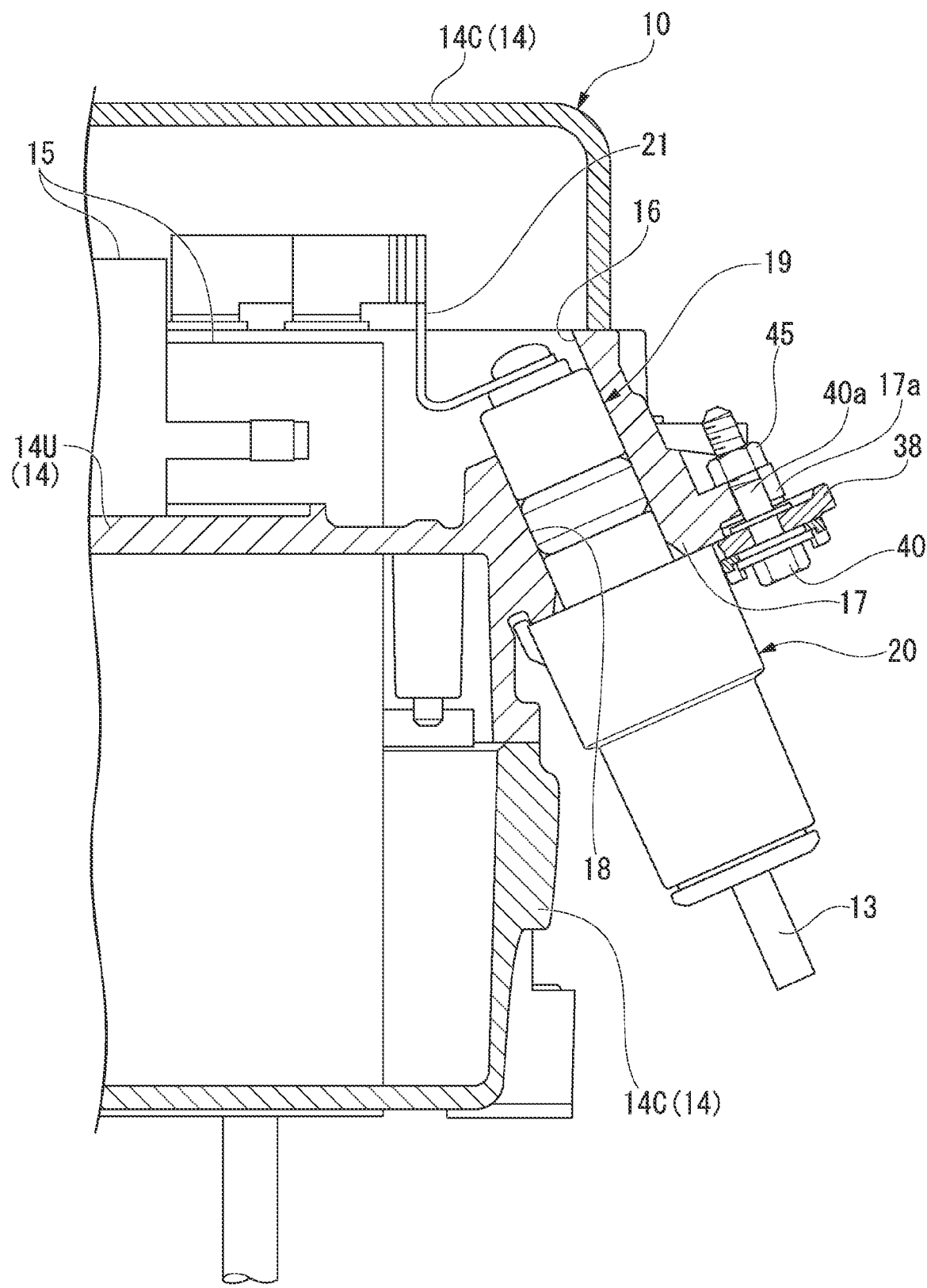
FIG. 2 is a cross-sectional view along line II-II of FIG. 1 of the power control unit of the embodiment.
Figure 3:
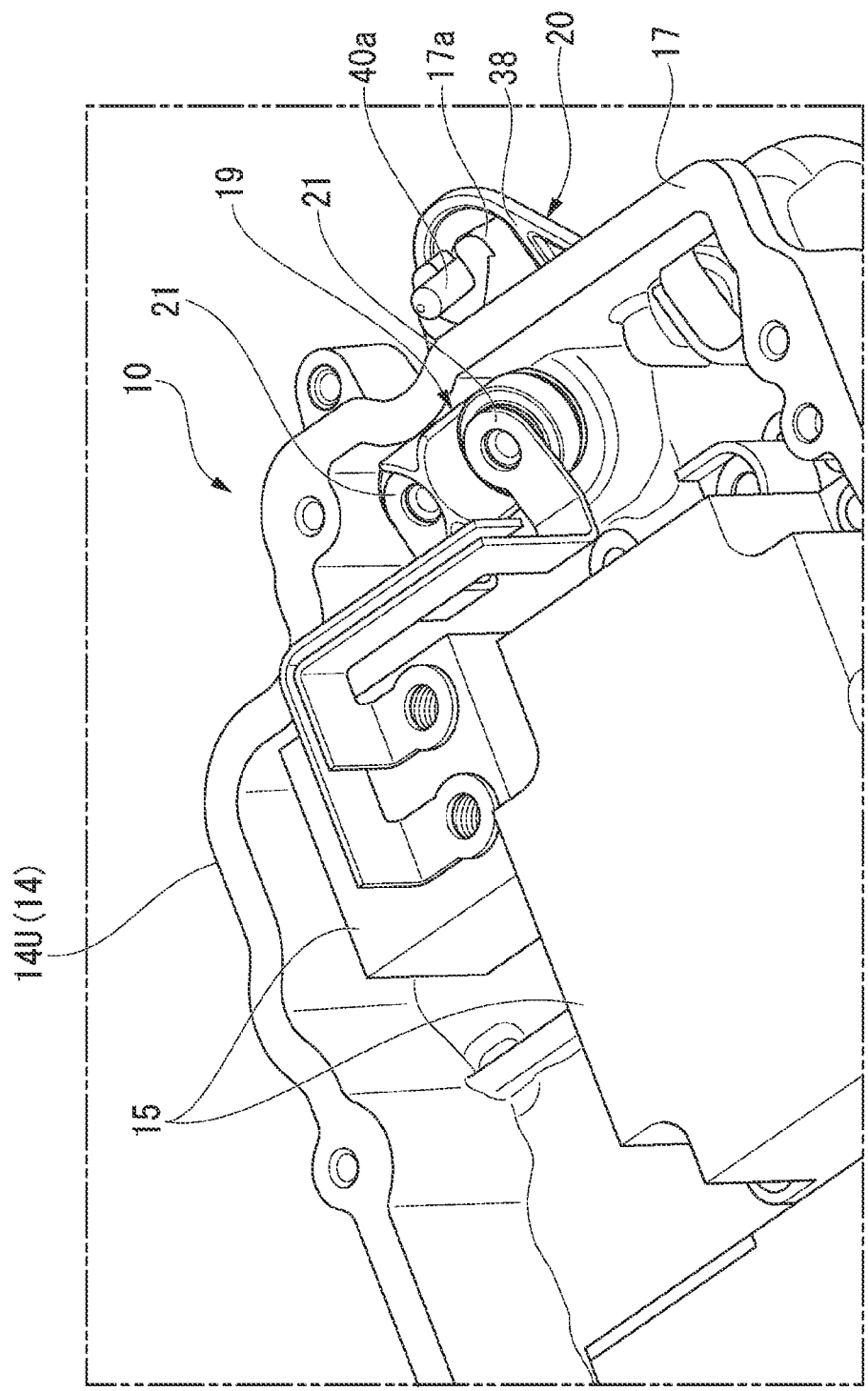
FIG. 3 is a perspective view of the power control unit of the embodiment, a case cover of which is removed.

FIG. 2 is a cross-sectional view along line II-II of FIG. 1 of the power control unit 10, and FIG. 3 is a perspective view of the power control unit 10, some parts of which are removed.

In the power control unit 10, an electric power control device 15 such as an inverter, a converter configured to convert a voltage, a reactor, a capacitor, or the like is accommodated in a unit case 14 formed in a substantially rectangular shape when seen in a top view. The unit case 14 includes a lower case 14L, an upper case 14U joined to an upper portion of the lower case 14L, and a case cover 14C configured to close an opening 16 above the upper case 14U. In the embodiment, the lower case 14L and the upper case 14U constitute a case main body. As shown in FIG. 2, a bulging portion behind a rear end portion of the lower case 14L of the vehicle is provided on a rear portion of the upper case 14U. Hereinafter, this portion is referred to as a rearward bulging section 17.

A connector attachment hole 18 passing through the bottom wall portion obliquely downward is formed in the rearward bulging section 17 of the upper case 14U. A unit-side connector 19 is attached to the connector attachment hole 18 through bolt fastening. A cable-side connector 20 is connected to the unit-side connector 19 from the side of the lower surface of the rearward bulging section 17.

Figure 4:
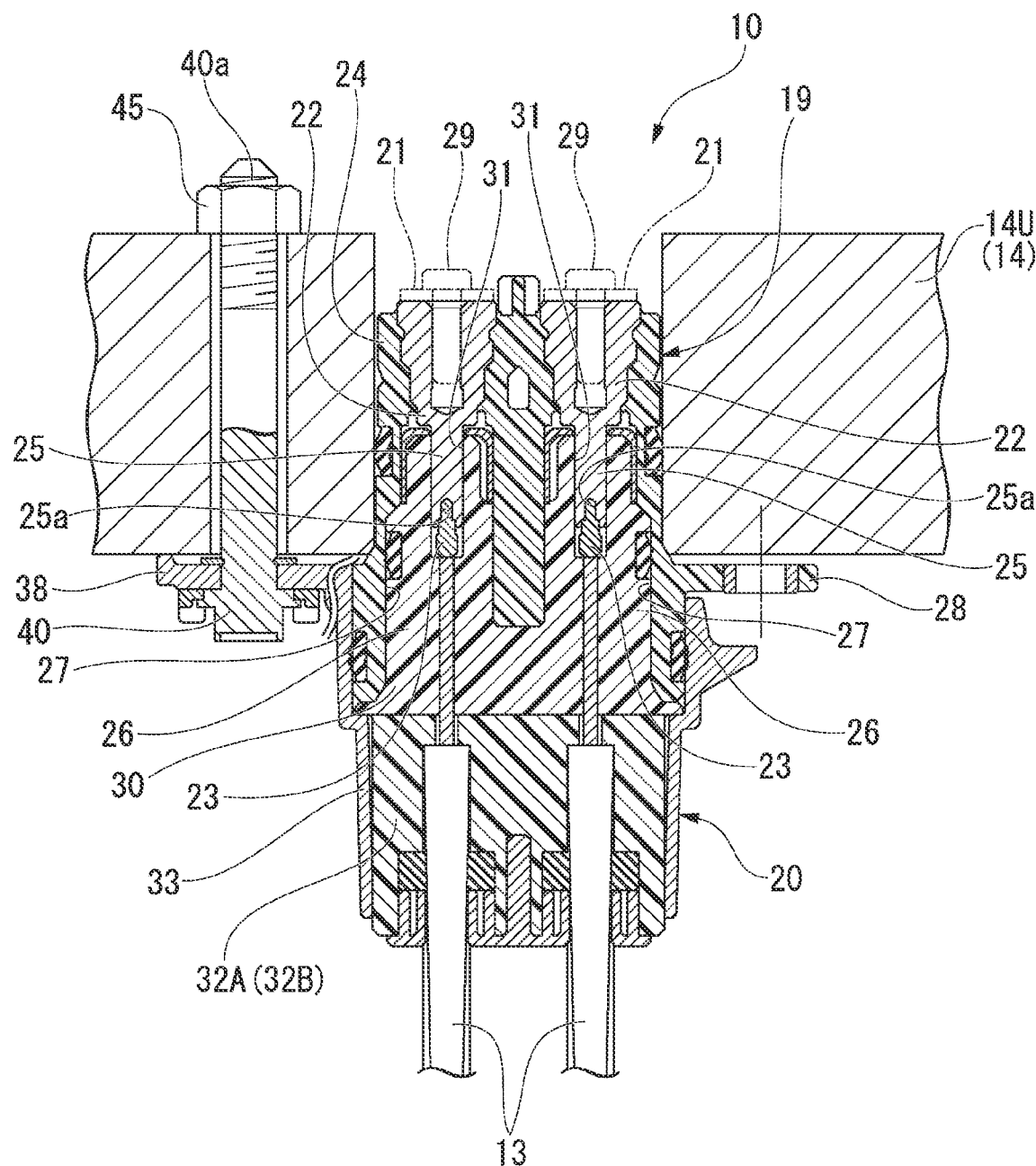
FIG. 4 is a cross-sectional view showing a connecting section between the power control unit of the embodiment and a power supply cable.
Figure 5:
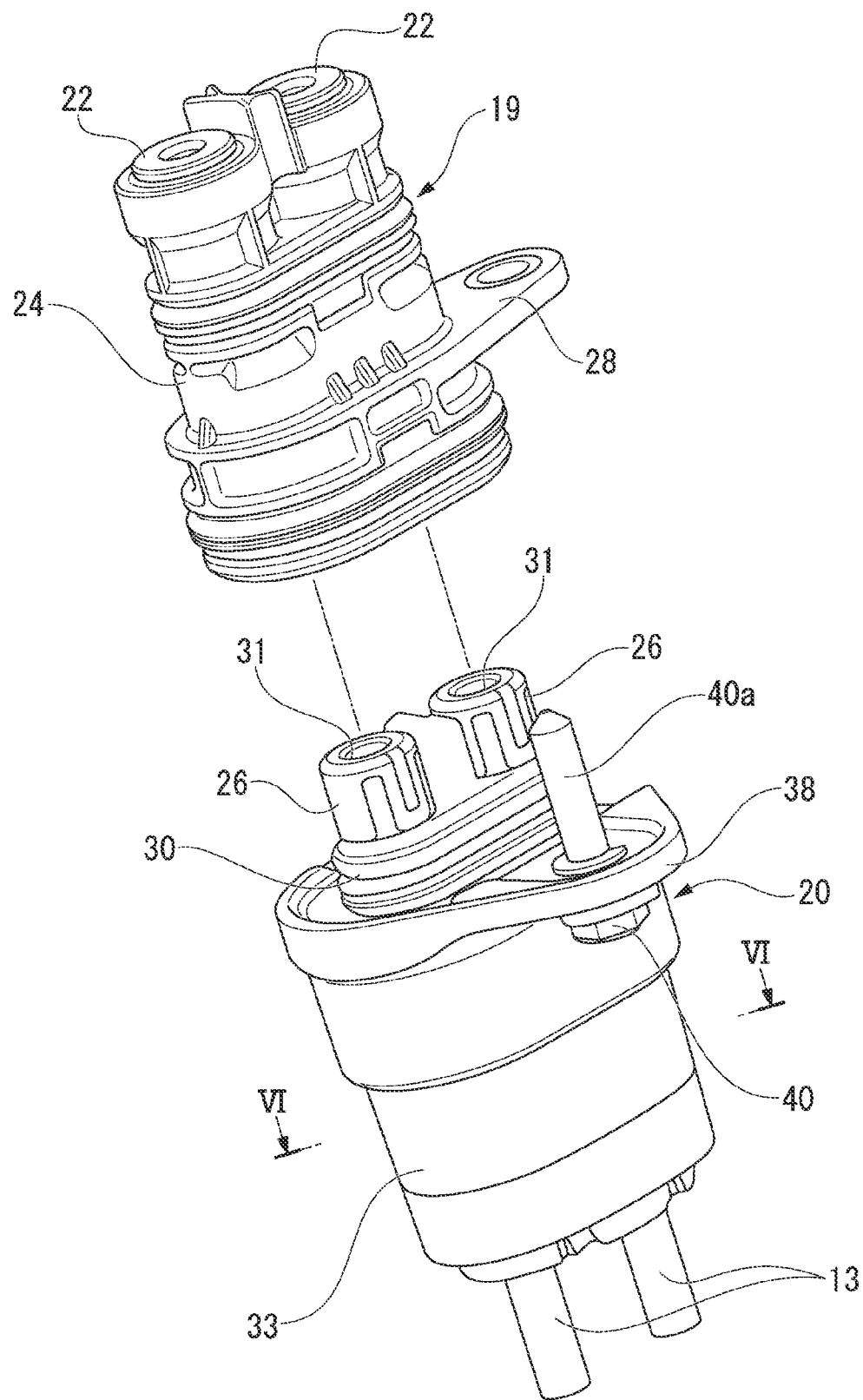
FIG. 5 is an exploded perspective view of a unit-side connector and a cable-side connector of the embodiment.

FIG. 4 is a cross-sectional view showing a connecting section between the power control unit 10 and the power supply cable 13. FIG. 5 is an exploded perspective view of the unit-side connector 19 and the cable-side connector 20. Parts of shapes of the upper case 14U and the case cover 14C in FIG. 4 are shown differently from an actual structure of FIG. 2 in order to simplify the illustration and make them easier to understand.

The unit-side connector 19 includes a pair of first connection terminals 22 connected to the electric power control device 15 in the unit case 14 via a bus bar 21 (a power supply passage). The cable-side connector 20 includes a pair of second connection terminals 23 to which an end portion of the power supply cable 13 is connected.

In the unit-side connector 19, the pair of first connection terminals 22 are disposed in parallel, and the first connection terminals 22 are integrated with a connector block 24 formed of a resin through molding. The first connection terminals 22 include connecting pins 25 protruding downward. A connecting hole 25a is formed in the lower end of the connecting pin 25. The unit-side connector 19 is attached to the unit case 14 such that the lower end of the connecting pin 25 of the first connection terminal 22 is directed to a side below the unit case 14. An upper end portion of the first connection terminal 22 is exposed on the side of the upper surface of the connector block 24. The bus bar 21 connected to the electric power control device 15 overlaps the upper surface of the upper end portion of the first connection terminal 22 and is connected to the first connection terminal 22 by a bolt 29 in this state.

A fitting concave section 27 into which a protrusion 26 provided on an upper portion of a cable-side connector 22 is fitted is formed in the connector block 24 on the side of the lower surface. A connecting flange 28 that bulges across the extension direction of the first connection terminal 22 is formed integrally with the outer circumferential surface of the connector block 24 near the lower portion. The connecting flange 28 is fastened and fixed to the lower surface of the unit case 14 (the lower surface of the rearward bulging section 17) by a bolt (not shown) in a state in which the upper region of the connector block 24 is inserted into the connector attachment hole 18.

In the cable-side connector 20, the pair of second connection terminals 23 connected to the power supply cable 13 are held on a connector block 30 formed of a resin. The pair of protrusions 26 protruding upward are provided on the upper portion of the connector block 30. A fitting hole 31 into which the connecting pin 25 of the first connection terminal 22 is fitted is formed in the upper end surface of each of the protrusions 26. The second connection terminals 23 are fixed to a bottom portion of the fitting hole 31. When each of the connecting pins 25 of the first connection terminals 22 is fitted into the fitting hole 31 of the protrusion 26, the second connection terminals 23 disposed on the bottom portion of the fitting hole 31 are fitted into and connected to the corresponding connecting holes 25a of the first connection terminals 22.

The cable-side connector 20 includes a pair of retainer blocks 32A and 32B configured to sandwich the power supply cable 13. The retainer blocks 32A and 32B are disposed below the connector block 30. Parts of the retainer blocks 32A and 32B and the connector block 30 near the lower portion are accommodated in a connector case 33 formed of aluminum.

The connector case 33 is formed in a substantially cylindrical shape with a narrowed lower side, and a connecting flange 38 that bulges across the upward/downward direction is formed on an upper end portion thereof. A bolt 40 is fixed to the connecting flange 38 such that a shaft section 40a protrudes upward. The shaft section 40a of the bolt 40 passes through a flange section 17a (see FIG. 2) protruding upward on the rearward bulging section 17 of the upper case 14U (the unit case 14) from below. A nut 45 is fastened to the shaft section 40a of the bolt 40 passing through the flange section 17a of the upper case 14U from above. Accordingly, the cable-side connector 20 is fixed to the lower surface of the upper case 14U (the unit case 14) and also stays fixed to the unit-side connector 19.

Figure 6:
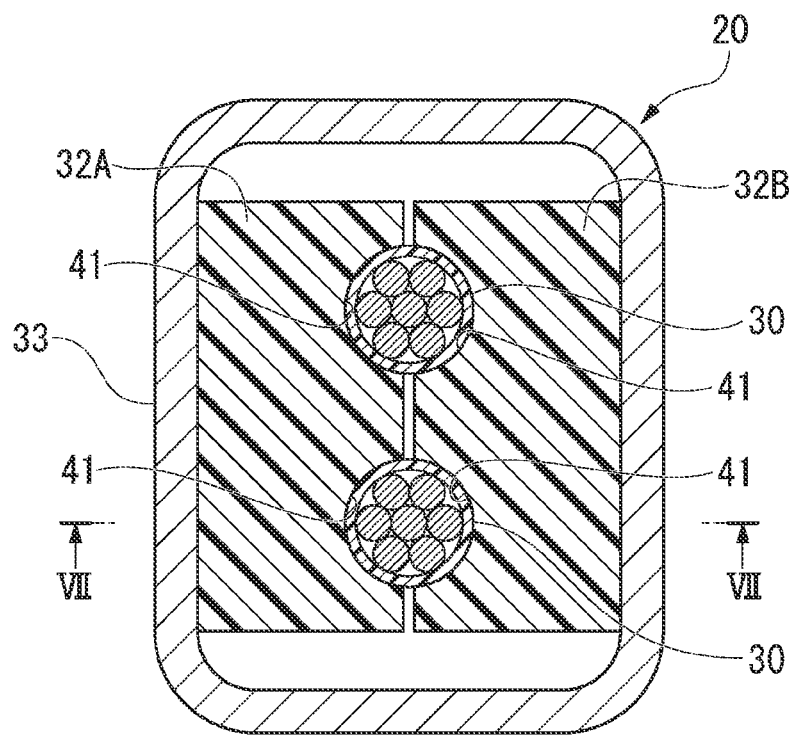
FIG. 6 is a cross-sectional view along line VI-VI of FIG. 5 of the cable-side connector of the embodiment.
Figure 7:
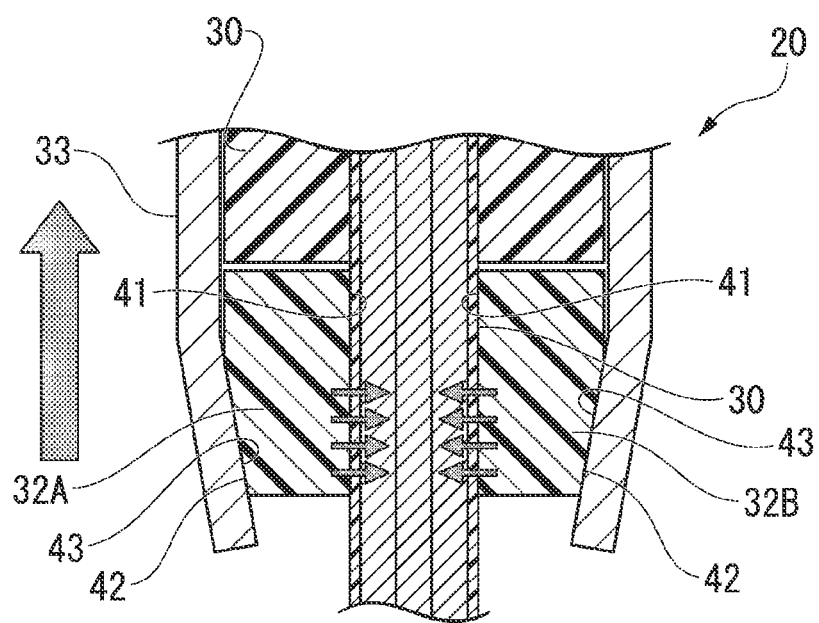
FIG. 7 is a cross-sectional view along line VII-VII of FIG. 6 of the cable-side connector of the embodiment.

FIG. 6 is a cross-sectional view along line VI-VI of FIG. 5 of the cable-side connector 20, and FIG. 7 is a cross-sectional view along line VII-VII of FIG. 6 of the cable-side connector 20.

The retainer blocks 32A and 32B have flat surfaces extending in a substantially vertical direction, and are disposed in the connector case 33 in a state in which the flat surfaces face each other with a gap sandwiched therebetween. Holding grooves 41 configured to hold the outer circumferential surface of the power supply cable 13 are formed in the flat surfaces of the retainer blocks 32A and 32B. The holding grooves 41 are substantially semi-circular grooves, and extend in the flat surfaces of the retainer blocks 32A and 32B in the upward/downward direction.

Tapered surfaces 42 inclined downward toward the holding groove 41 are formed on the outer side surfaces of the retainer blocks 32A and 32B. Meanwhile, tapered surfaces 43 inclined at substantially the same angle as the tapered surfaces 42 are formed on the lower region of the connector case 33 to face the tapered surfaces 42 of the retainer blocks 32A and 32B. The tapered surfaces 43 of the connector case 33 are pressed against the tapered surfaces 42 of the retainer blocks 32A and 32B from below when the connector case 33 is pulled upward according to fastening of the nut 45 to the shaft section 40a of the bolt 40. Here, a slip occurs between the tapered surfaces 43 and 42, and a cam action by both of the tapered surfaces 43 and 42 compresses a gap between the retainer blocks 32A and 32B. As a result, the holding grooves 41 of the retainer blocks 32A and 32B are pressed against the outer circumferential surface of the power supply cable 13, and the power supply cable 13 is firmly sandwiched between the retainer blocks 32A and 32B.

In the embodiment, the tapered surfaces 42 and 43 constitute cam surfaces of the retainer blocks 32A and 32B and the connector case 33.

<Connection of Power Control Unit and Power Supply Cable>

In fact, when the power supply cable 13 is connected to the power control unit 10, the unit-side connector 19 is previously attached to the unit case 14 through bolt fastening, and the case cover 14C is removed from above the upper case 14U.

In this state, the bus bar 21 is connected to an upper portion of the first connection terminal 22 of the unit-side connector 19 by the bolt 29 (see FIG. 4) through the opening 16 above the upper case 14U.

Next, the opening 16 above the upper case 14U is closed by the case cover 14C, and the case cover 14C is fastened to the upper case 14U by a bolt.

After that, the cable-side connector 20 is disposed on the lower surface of the rearward bulging section 17 of the upper case 14U, and the shaft section 40a of the bolt 40 fixed to the cable-side connector 20 passes upward through the flange section 17a of the rearward bulging section 17 from below. Here, the protrusion 26 of the cable-side connector 20 is fitted into the fitting concave section 27 of the unit-side connector 19, and the connecting pin 25 of the first connection terminal 22 is fitted into the fitting hole 31 of the protrusion 26. After that, the nut 45 is fastened to the shaft section 40a protruding upward from the flange section 17a of the rearward bulging section 17.

Accordingly, the cable-side connector 20 is pressed against the unit-side connector 19, the first connection terminals 22 and the second connection terminals 23 are maintained in a connected state, and the cable-side connector 20 is fixed to the upper case 14U (the unit case 14). The power supply cable 13 is firmly sandwiched in the cable-side connector 20 by the retainer blocks 32A and 32B as described above.

<Effects of Embodiment>

As described above, the cable connection part structure of the embodiment passes upward through the shaft section 40a of the bolt 40 fixed to the cable-side connector 20 from below in the unit case 14 of the power control unit 10, and the cable-side connector 20 can be fixed to the power control unit 10 and the unit-side connector 19 by fastening the nut 45 to the shaft section 40a of the bolt 40 from above the unit case 14 in a state in which the cable-side connector 20 is connected to the unit-side connector 19. Accordingly, when the cable connection part structure of the embodiment is employed, the cable-side connector 20 disposed below the power control unit 10 can be easily fixed to the unit-side connector 19 from above.

In the cable connection part structure of the embodiment, the connecting section (the bolt 29) of the bus bar 21 and the unit-side connector 19 (the first connection terminals 22) is accessible from above through the opening 16 of the upper case 14U (the unit case 14). For this reason, before the case cover 14C is attached to the upper case 14U (the case main body), the bus bar 21 can be easily connected to the first connection terminal 22 of the unit-side connector 19 from above through the opening 16 of the upper case 14U.

In the cable connection part structure of the embodiment, the pair of retainer blocks 32A and 32B that sandwich the power supply cable 13 are accommodated in the connector case 33 of the cable-side connector 20, and the tapered surfaces 42 and 43 that can abut each other are provided on the retainer blocks 32A and 32B and the connector case 33. Then, the tapered surfaces 42 and 43 can press the retainer blocks 32A and 32B inward in the radial direction according to upward displacement of the connector case 33 when the nut 45 is fastened to the shaft section 40a of the bolt 40 upon fixing of the cable-side connector 20. For this reason, the power supply cable 13 can be firmly fixed to the cable-side connector 20 by the pair of retainer blocks 32A and 32B, and a large shake of the power supply cable 13 due to traveling of the vehicle can be minimized.

In the cable connection part structure of the embodiment, when the cable-side connector 20 has a function of minimizing a large shake of the power supply cable 13 and the cable-side connector 20 is attached to the power control unit 10, a shake of the power supply cable 13 can be minimized by fastening the nut 45 from above. Accordingly, there is no need to separately attach the support member to the power control unit 10 to minimize a shake of the power supply cable 13.

The present invention is not limited to the embodiment, and various design changes may be made without departing from the spirit of the present invention. For example, while the pair of retainer blocks 32A and 32B are accommodated in the connector case 33 in the embodiment, the number of retainer blocks accommodated in the connector case may be three or more.

What is claimed is:

1. A cable connection part structure for a power control unit that connects a power control unit configured to control electric power and a power supply cable pulled out downward from the power control unit, the cable connection part structure comprising:

the power control unit having an electric power control device and a unit case that accommodates the electric power control device;

a unit-side connector connected to a power supply passage of the electric power control device in the unit case and having a first connection terminal directed toward a space below the unit case; and a cable-side connector connected to the power supply cable and having a second connection terminal connected to the first connection terminal from below the unit case, wherein the cable-side connector has:

a connector case configured to support the second connection terminal; and a bolt fixed to the connector case and having a shaft section passing upward through a part of the unit case from below, and the cable-side connector is fixed to the unit case and the unit-side connector by fastening a nut to the shaft section passing through the unit case from above, wherein the cable-side connector comprises a plurality of retainer blocks accommodated in the connector case and configured to sandwich the power supply cable from an outer side in a radial direction, and the retainer blocks and the connector case have cam surfaces that push the retainer blocks inward in the radial direction according to upward displacement of the connector case when the nut is fastened to the shaft section of the bolt.

2. The cable connection part structure for a power control unit according to claim 1, wherein the unit case comprises:

a case main body configured to accommodate the electric power control device and open a connecting section of the power supply passage and the first connection terminal from above; and a case cover configured to cover the case main body from above, and the power supply passage is able to be connected to the first connection terminal through an opening above the case main body.

* * * * *